Dec. 26, 1961     J. W. HARRISON     3,014,320

METHOD OF APPLYING SHRINK COVERS

Filed Dec. 19, 1960     2 Sheets-Sheet 1

3,014,320
METHOD OF APPLYING SHRINK COVERS

John W. Harrison, Winchester, Mass., assignor to W. R. Grace & Co., Cambridge, Mass., a corporation of Connecticut
Filed Dec. 19, 1960, Ser. No. 76,841
3 Claims. (Cl. 53—42)

This invention relates to the covering and sealing of containers and, more particularly, to the covering and sealing of large numbers of containers known as "individual service cups."

The small size and thin wall of these miniature containers makes them difficult to cover and to seal in a satisfactory manner.

The objects of this invention are to cover and seal securely large numbers of cups; to produce a machine which will perform this function automatically and at low cost; to cover individual service cups and seal them securely no matter of what material made; to avoid the necessity of adhesives and special coatings either on the cover or the container; and to seal individual service cups rapidly and at very low cost.

The machine accepts filled containers from an automatic filler and distributor (which is not part of this invention). It then covers successive rows of containers with a heat shrinkable film, shrinks the covering tightly about each container, and then delivers separate, sealed containers to a take-off station.

The invention will be better understood by reference to the drawings in which.

Figure 1:
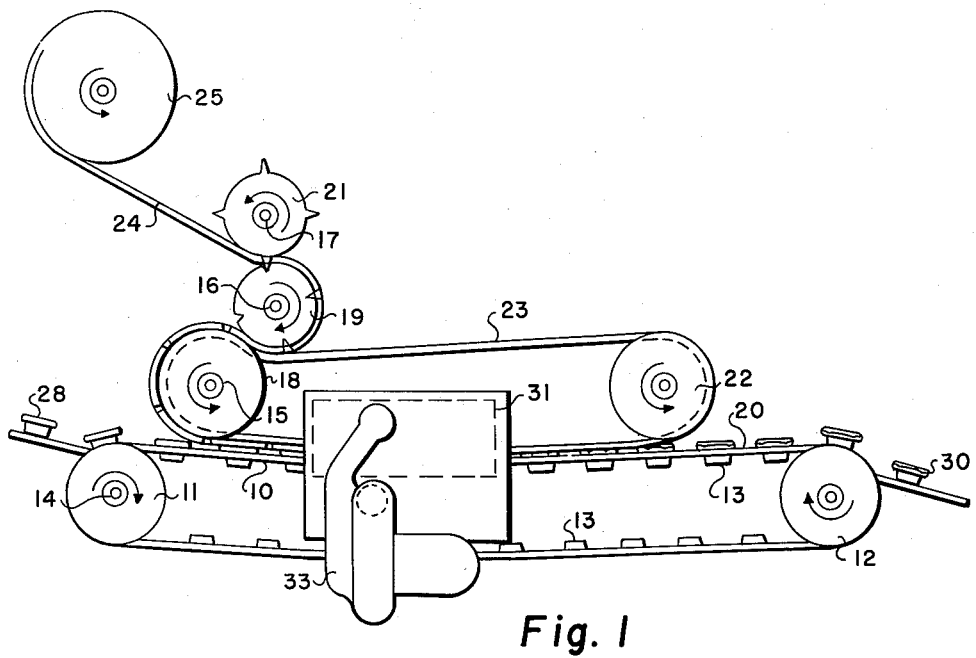
FIGURE 1 shows, in diagrammatic form, an elevation of the machine.

Referring to FIGURE 1, the machine comprises a carrier 10, formed from a foraminous belt, such as metallic mesh which passes in a closed loop over drive roll 11, and idler roll 12. A multiplicity of pockets 13, arranged in spaced, parallel rows are fastened to the belt in such a manner that an unobstructed, open face of each pocket is presented on the outer side of the belt flights.

Power drive means (not shown) are provided to rotate shaft 14, to which drive roll 11 is fixed. Shaft 14 is also connected by positive drive means (not shown) to the shafts 15, 16 and 17 of rolls 18, 19 and 21 to assure that all rolls travel at the same surface speed.

A second—but shorter—continuous belt 23, having the same width as carrier 10, is driven by roll 18 and passes over idler roll 22. It is positioned so that its entire lower flight lies in contact with, or closely adjacent to, the upper flight 20 of belt 11. Belt 23 is compressible and made of a heat resistant rubber, preferably silicone rubber.

Figure 2:
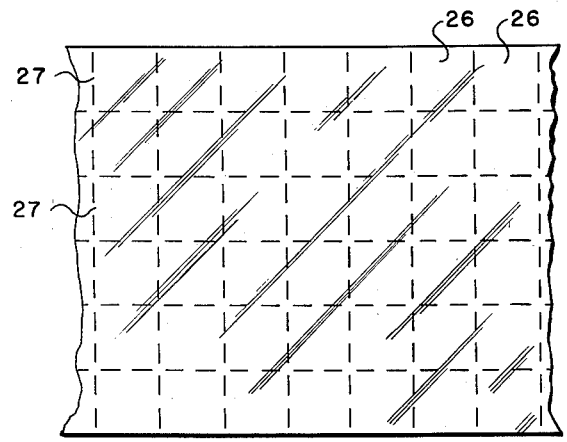
FIGURE 2 is a plan view of the covering after passing through the die cutting rolls.

The film covering for the individual service cups is delivered from supply roll 25. From roll 25, film 24 passes between die cutting roll 21 and die mating roll 19, where it is slashed, or perforated, in the pattern shown in FIGURE 2, which is a multiplicity of squares 26, each joined to its neighbor by a small unsevered portion 27, located at each corner and centrally on each side of the square.

The slashed film then passes onto the upper surface of the belt 23, which carries it around the pulley 18 and presses it into contact with carrier 10, where each of the squares 26 is centered over each of the pockets 13.

Pockets 13 are shaped to hold the containers 28. The containers may be paper, metal foil, or molded plastic. If the containers are made of paper or thin metal foil, they should be provided with a rolled edge as shown at 29, FIGURE 4. If the containers are molded from plastic, a sharply turned out rim is sufficient.

After each of the pockets has been loaded with the foodstuff, or condiment, by filling machinery, which forms no part of this invention, the individual containers are placed in the pockets 13 by a distributing arm of conventional design.

As the carrier 10 moves from left to right in FIGURE 1, the containers pass under the roll 18, and are covered by the slashed film 24. The belt then carries the loaded and covered containers into the oven 31, which is arranged to blow air up through the interstices of the mesh belt and against the exposed area of film. Belt 23 presses the film 24 down on to the rims, or margins 29, of the containers 28 tightly. The area of film which covers the open mouth of the container cannot move, both because it is protected from heat by the container itself, and because it is restrained by belt 23 from moving.

Figure 3:
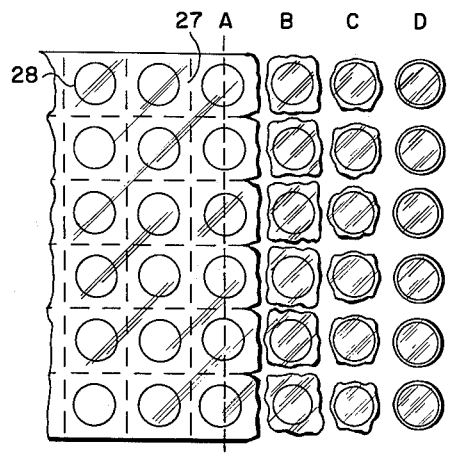
FIGURE 3 is a diagram of the shrinking action which occurs in the heat-shrinking zone.

FIGURE 3 is a representation of what occurs in the shrink oven 31, as the row A of containers enters the heat zone, the boundary of which is represented by the dotted line. Shrinkage tears the unsevered portions 27 apart. Each container is then covered by a small separate square of film, as shown at B. More shrinkage occurs as the row of containers moves further into the heat zone where the film draws against the body of the container, as shown at C. In the final stage (row D), the exposed film shrinks tightly about the margin of the containers 28, hugging in under the margin 29, locking on the covering, and forming the scalloped edge 32. The area covering the top of the container is not shrunk since it has not been heated and has been held in position by the belt 23.

The source of hot air may be derived from a combination of electric blower and heat coils, as shown at 33, or, it may be derived from any of the conventional means of heating air ovens. The temperature of the air may vary from 300° to 700° F., depending upon the speed at which the machine is required to operate. The covered containers leave the carrier 10 at the take-off station 30.

Several different materials are suitable as the covering film. Among such may be mentioned stretched films of rubber hydrochloride, stretched films of vinylidine chloride and films of analogous materials which have the necessary mechanical characteristics. But, because of its low cost and of its high tensile strength, and very high shrink energy, I prefer to use irradiated polyethylene which, subsequent to irradiation, has been stretched in both directions at least 350%. Irradiated, biaxially oriented polyethylene has high shrink energy, i.e., from 100 to 500 p.s.i. at 96° C. Shrink energy is the force of contraction at a given temperature when the material is restrained and, more specifically, it is the measurable tension in a fully mono-directionally restrained strip of film when the film is heated to the specified temperature.

I have used, successfully, as the base material of the film, Alathon 14, having an average molecular weight of 20,000, a density of 0.914 and a melt index of 1.8—which has been irradiated to an extent of about 12 megarads and then has been stretched biaxially 350% in both lateral and longitudinal directions—the finished thickness of the film may be from ½ to 5 mils. This material possesses the shrink energy of about 150 p.s.i. in both directions at 96° C. The irradiation may be accomplished in a conventional manner, e.g., by the use of electron beam generators such as the 2,000,000 volt, General Electric resonant transformer unit, or, a Van de Graaff electron accelerator operating at approximately 2,000,000 volts, with a power output of 500 watts. Other radiation sources, such as cobalt 60, may be employed provided equivalent total dosage is given.

Biaxial orientation may be accomplished by forcing air into a heated tube of polyethylene to form a bubble which is then trapped between two sets of pinch rolls. As the air enters, the tube of polyethylene undergoes both radial and longitudinal stretching to accommodate the air bubble. Trapped between the pinch rolls, the bubble "rides" through the whole length of the extrusion, stretching the polyethylene both laterally and longitudinally and, simultaneously, thinning the extrusion to film thickness.

One half mil film of the above material makes a successful cover for these small containers. The film may be thicker if desired but there is no apparent advantage in film thicknesses exceeding 1½ mils.

Figure 4:
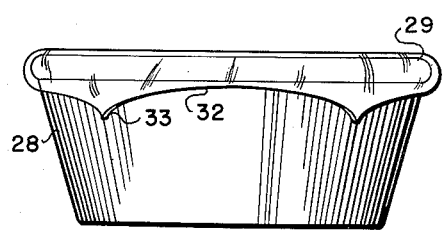
FIGURE 4 is an elevation of the finished product.

Heating will cause all exposed film to draw into a tight rim seal, but an easy opening container can be made by adjusting the temperature of the air in oven 31 and adjusting the duration of heating so that the four corners of the original square of film do not entirely disappear into the rim seal but, instead, leave four little pull tabs as at 33, FIGURE 4. The cover then has a scalloped edge 32. Any of the tabs 33 may be lifted and pulled by the user to open the package quickly and surely.

The machine eliminates the need of any special heat sealing dies, requires no pre-cut covers and has a high output.

I claim:

1. The method of sealing a plurality of individual service containers which includes arranging the filled containers in a series of spaced parallel rows, supporting said containers against downwardly directed pressure, forming longitudinal and transverse rows of discontinuous slashes in a sheet of heat shrinkable film whereby the film is divided into a multiplicity of connected squares, centering the squares over the filled containers, pressing the film between a resilient pressing member and the rim of each container, and directing heat upwardly against the exposed area of film to separate the squares and to cause the exposed film area of each square to shrink into sealing contact with the margin and the side wall of each container.

2. A machine for applying covers of heat shrinkable film material to individual service containers comprising a foraminous carrier formed in a closed loop, drive and idler rolls supporting the carrier, a multiplicity of outwardly directed, open faced pockets affixed to the carrier in parallel, uniformly spaced rows, means to deliver and to place filled individual service containers in each pocket, means to carry and to press a web of film into contact with the rim of each container comprising a compressible belt supported above the carrier, drive and idler rolls supporting the belt, a die cutting and a die mating roll supported above the belt, the cutting elements of said rolls being arranged to form discontinuous slashes in the web of film at distances corresponding to the central line between any two carrier pockets, means to power the machine, power transmitting means interconnecting the drive rolls and the cutting roll and maintaining the motion of said rolls, carrier and belt at speeds which center progressively each slashed element of the web over each pocket, means to heat the exposed area of the web extending beyond the margins of each container to tear the web into separate container covers and shrink the cover tightly about the margins of each container, the further advance of the carrier serving to deliver sealed individual containers to a delivery station.

3. The method according to claim 1 wherein the heat-shrinkable film is biaxially oriented polyethylene exhibiting a shrink energy when heated to 96° C. of from 100 to 500 p.s.i.

References Cited in the file of this patent

UNITED STATES PATENTS

| | | |
|---|---|---|
| 2,904,943 | Dreyfus et al. | Sept. 22, 1959 |
| 2,927,409 | Heyer | Mar. 8, 1960 |
| 2,958,168 | Vogt | Nov. 1, 1960 |